United States Patent
Kikuchi

(10) Patent No.: US 7,218,208 B2
(45) Date of Patent: May 15, 2007

(54) OBJECT DETECTING SYSTEM FOR VEHICLE

(75) Inventor: Hayato Kikuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 10/975,837

(22) Filed: Oct. 27, 2004

(65) Prior Publication Data
US 2005/0174222 A1    Aug. 11, 2005

(30) Foreign Application Priority Data
Nov. 7, 2003    (JP)    ............................. 2003-378856

(51) Int. Cl.
*B60Q 1/00*    (2006.01)
(52) U.S. Cl. ........................ 340/435; 340/903; 342/70; 701/301
(58) Field of Classification Search ................ 340/903, 340/435, 436; 701/96, 301; 342/70, 71, 342/165; 180/179
See application file for complete search history.

(56) References Cited

U.S. PATENT DOCUMENTS

| | | | | |
|---|---|---|---|---|
| 5,529,139 A | * | 6/1996 | Kurahashi et al. | 180/169 |
| 6,087,975 A | * | 7/2000 | Sugimoto et al. | 342/70 |
| 6,414,628 B1 | * | 7/2002 | Ashihara | 342/173 |
| 6,757,611 B1 | * | 6/2004 | Rao et al. | 701/301 |
| 7,042,344 B2 | * | 5/2006 | Chiba et al. | 340/435 |
| 2002/0095254 A1 | * | 7/2002 | Egawa et al. | 701/96 |

FOREIGN PATENT DOCUMENTS

JP    P3428009    7/2003

* cited by examiner

*Primary Examiner*—Brent A. Swarthout
(74) *Attorney, Agent, or Firm*—O'Melveny & Myers LLP

(57) ABSTRACT

Whether or not a radar device detects an object is determined by a detection state determinator. Whether or not a time during which the object is not detected and which is measured by a clocking device becomes a determination threshold value or more, is determined by a non-detection determinator. Based on the determination results, an informing device informs an occupant that the object is not detected for a predetermined time or more. Therefore, a state in which the radar device does not detect an object due to absence of the object on a road in a desert or the like is prevented from being erroneously determined as a state caused by contamination of the radar device. Also, the occupant can easily determine whether the operation of the informing device is actually caused by absence of an object or contamination of the radar device, based on the environment around the road on which the own vehicle is traveling. Especially because a reflected wave from a road surface, of which intensity changes in accordance with the condition, is not used for determination, it becomes unnecessary to change the setting of the determination threshold value and determination frequency region, and thus the structure and operation are simplified.

14 Claims, 9 Drawing Sheets

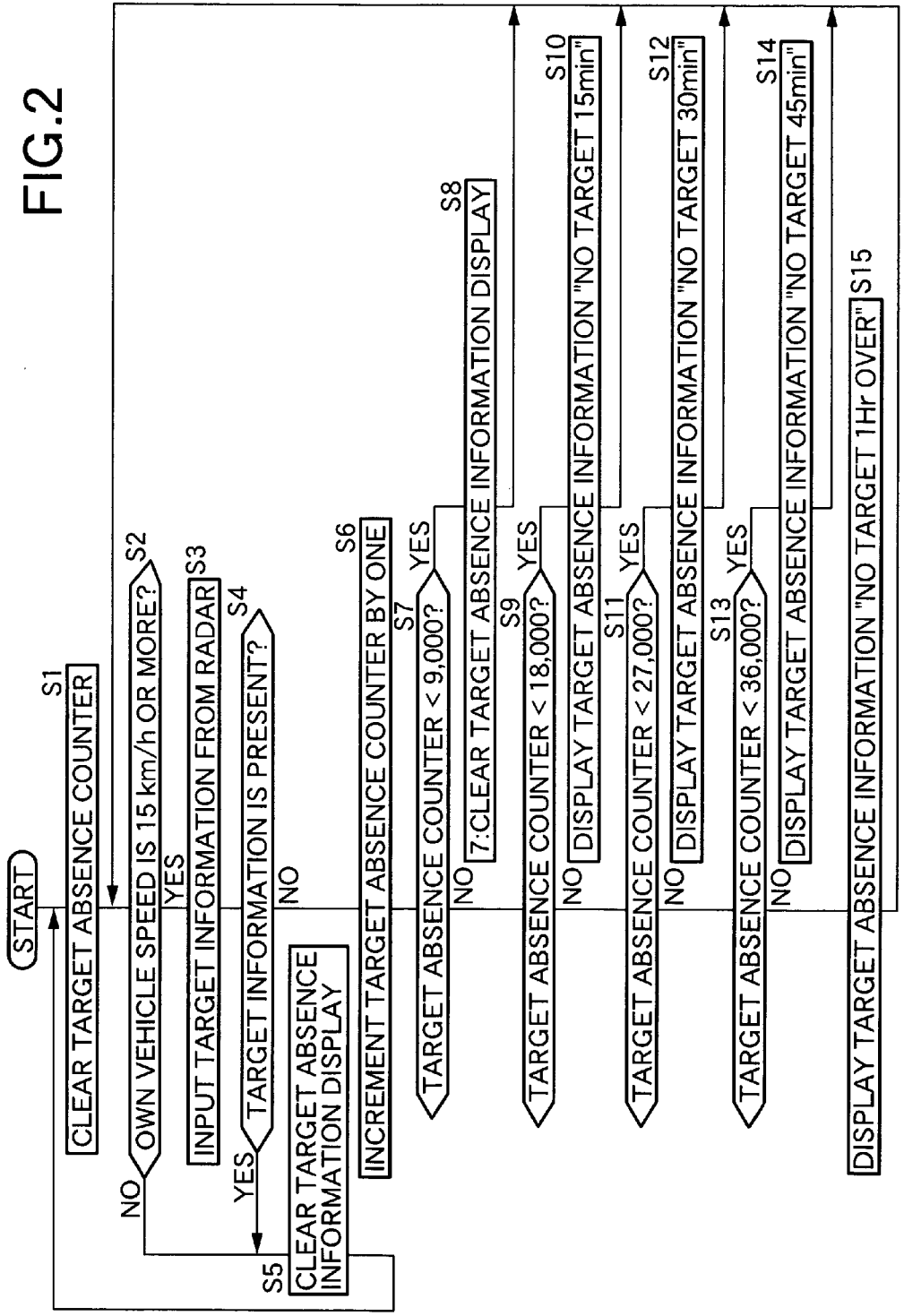

OBJECT DETECTING SYSTEM FOR VEHICLE

BACKGROUND OF THE INVENTION

1. Field of the Invention

The present invention relates to an object detecting system for a vehicle, the object detecting system detecting an object such as a preceding vehicle by using an object detector such as a radar device.

2. Description of Related Art

When contamination such as mud or snow attaches to a transmitter/receiver section of a radar device, the object such as a preceding vehicle cannot be accurately detected, so that a system using the detection result cannot be properly operated. In order to solve this problem, Japanese Patent Publication No. 3428009 discloses an object detecting system, in which the threshold value of the reception level of the radar device is constructed by a first threshold value set to be lower than the reception level of the reflected wave from the road surface and a second threshold value which is set to be higher than the first threshold value so as to detect an object such as a preceding vehicle that should be detected; and when the reflected wave at the level exceeding the first threshold value is hardly received in a predetermined time, it is determined that contamination attaches to the transmitter/receiver section of the radar device to issue an alarm.

The reflected wave from a road surface, which is received by the radar device, changes in accordance with the kind of pavement, snowfall state, rainfall state and the like. For this reason, in the above-described conventional object detecting system, it is necessary to set the first threshold value corresponding to the condition of the road surface in order to enhance the determination accuracy of the contamination of the transmitter/receiver section of the radar device; and it is necessary to compare only the reflected wave in a predetermined beat frequency region corresponding to the reflected wave from a road surface with the first threshold value in order to distinguish the reflected wave from the road surface from those from the other objects. Therefore, there is a problem of complicated structure and operation.

SUMMARY OF THE INVENTION

The Present invention is made in view of the above circumstances, and has an object to simplify a structure and an operation of an object detecting system for a vehicle, having a function of determining contamination of an object detector.

In order to attain the above-described object, according to a first feature of the invention, there is proposed an object detecting system for a vehicle, comprising: an object detector which is mounted on a vehicle and detects an object existing ahead in an own vehicle traveling direction; a detection state determinator which determines whether or not the object is detected by the object detector; a clocking device which measures a time during which it is determined that the object is not detected by the detection state determinator; a non-detection determinator which determines whether or not the time measured by the clocking device becomes a determination threshold value or more; and an informing device which informs an occupant that the object is not detected for a predetermined time or more, based on a determination result of the non-detection determinator.

According to a second feature of the invention, there is proposed an object detecting system for a vehicle, comprising: an object detector which is mounted on a vehicle and detects an object existing ahead in an own vehicle traveling direction; a detection state determinator which determines whether or not the object is detected by the object detector; a travel distance calculator which calculates an own vehicle travel distance in a time during which it is determined that the object is not detected by the detection state determinator; a non-detection determinator which determines whether or not the own vehicle travel distance calculated by the travel distance calculator becomes a determination threshold value or more; and an informing device which informs an occupant that the object is not detected in a predetermined travel distance or more, based on a determination result of the non-detection determinator.

According to a third feature of the invention, in addition to the first or second feature, the non-detection determinator includes a plurality of determination threshold values, and the informing device changes an information content in accordance with the determination threshold value which is used in determination.

According to a fourth feature of the invention, in addition to any one of the first to third features, the information which is given to the occupant by the informing device is the determination threshold value used in determination.

According to a fifth feature of the invention, in addition to the third feature, the informing device gives information to the occupant by changing color of a plurality of regions previously specified on a display in accordance with the determination threshold value.

According to a sixth feature of the invention, in addition to the fifth feature, the plurality of regions are constructed by a plurality of rectangular regions or a plurality of circular regions.

According to a seventh feature of the invention, in addition to the fifth feature, the plurality of regions are constructed by a plurality of sector regions formed by equally dividing a circular region.

According to an eighth feature of the invention, in addition to any one of the first feature, and the third to seventh features, there is proposed the object detecting system for a vehicle, further comprising a vehicle speed sensor for detecting an own vehicle speed, and the clocking device performs clocking when the own vehicle speed is at a predetermine value or more.

According to a ninth feature of the invention, comprising an object detector which is mounted on a vehicle and detects an object existing ahead in an own vehicle traveling direction; a detection state determinator which determines whether or not the object is detected by the object detector; a clocking device which measures a time during which it is determined that the object is not detected by the detection state determinator; and an informing device which informs an occupant of the time measured by the clocking device.

According to a tenth feature of the invention, there is proposed an object detecting system for a vehicle, comprising: an object detector which is mounted on a vehicle and detects an object existing ahead in an own vehicle traveling direction; a detection state determinator which determines whether or not the object is detected by the object detector; a travel distance calculator which calculates an own vehicle travel distance in a time during which it is determined that the object is not detected by the detection state determinator; and an informing device which informs an occupant of the own vehicle travel distance which is calculated by the travel distance calculator.

A radar device Sa in embodiments corresponds to the object detector of the present invention.

With the first feature, whether or not the object detector detects an object existing ahead in the own vehicle traveling direction is determined by the detection state determinator; whether or not a time during which the object is not detected and which is counted by the clocking device becomes a determination threshold value or more, is determined by the non-detection determinator; and based on the determination result of the non-detection determinator, the informing device informs an occupant that the object is not detected for a predetermined time or more. Therefore, a state in which the radar device does not detect an object due to absence of an object on a road in a desert or the like is prevented from being erroneously determined as a state caused by contamination of the radar device, so that the sense of discomfort of the occupant can be eliminated. Also, the occupant can easily determine whether the operation of the informing device is actually caused by absence of an object or contamination of the radar device, based on the environment around the road on which the own vehicle is traveling. Especially because a reflected wave from a road surface, of which intensity changes in accordance with the condition, is not used for determination, it becomes unnecessary to change the setting of the determination threshold value and determination frequency region, and thus the structure and operation are simplified.

With the second feature, whether or not the object detector detects an object existing ahead in the own vehicle traveling direction is determined by the detection state determinator; whether or not an own vehicle travel distance in which the object is not detected and which is calculated by the travel distance calculator becomes a determination threshold value or more, is determined by the non-detection determinator; and based on the determination results of the non-detection determinator, the informing device informs an occupant that the object is not detected in a predetermined distance or more. Therefore, a state in which the radar device does not detect an object due to absence of an object on a road in a desert or the like is prevented from being erroneously determined as a state caused by contamination of the radar device, so that the sense of discomfort of the occupant can be eliminated. Also, the occupant can easily determine whether the operation of the informing device is actually caused by absence of an object or contamination of the radar device, based on the environment around the road on which the own vehicle is traveling. Especially because a reflected wave from a road surface, of which intensity changes in accordance with the condition, is not used for determination, it becomes unnecessary to change the setting of the determination threshold value and determination frequency region, and thus the structure and operation are simplified.

With the third feature, the informing device changes the information content in accordance with the determination threshold value which is used for determination threshold value which is used for determination out of a plurality of determination threshold values, and therefore the occupant can precisely grasp the time or the own vehicle travel distance in which the object detector does not detect the object.

With the fourth feature, the informing device informs the occupant of the determination threshold value used for determination, and therefore the occupant can specifically grasp the time or the own vehicle travel distance in which the object detector does not detect the object.

With the fifth feature, the informing device gives information to the occupant by changing the color of a plurality of regions previously specified on the display in accordance with the determination threshold values, and therefore the occupant can visually recognize the object detection state of the object detector easily and reliably.

With the sixth feature, a plurality of regions of the display are constructed by a plurality of rectangular regions or a plurality of circular regions, and therefore the occupant can visually instantly recognize the object detection state of the object detector.

With the seventh feature, a plurality of regions of the display are constructed by a plurality of sector regions formed by equally dividing the circular region, and therefore the occupant can visually instantly recognize the object detection state of the object detector.

With the eighth feature, the clocking device performs clocking when the own vehicle speed detected by the vehicle speed sensor is at the predetermined value or more, and therefore unnecessary clocking can be prevented when the vehicle is stopped and when the vehicle is caught in a traffic jam.

With the ninth feature, whether or not the object detector detects an object existing ahead in the own vehicle traveling direction is determined by the detection state determinator; and the informing device informs the occupant of the time during which the object is not detected and which is counted by the clocking device. Therefore, a state in which the radar device does not detect an object due to absence of an object on a road in a desert or the like is prevented from being erroneously determined as a state caused by contamination of the radar device, so that the sense of discomfort of the occupant can be eliminated. Also, the occupant can easily determine whether the operation of the informing device is actually caused by absence of an object or contamination of the radar device, based on the environment around the road on which the own vehicle is traveling. Especially because a reflected wave from a road surface, of which intensity changes in accordance with the condition, is not used for determination, it becomes unnecessary to change the setting of the determination threshold value and determination frequency region, and thus the structure and operation are simplified.

With the tenth feature, whether or not the object detector detects an object existing ahead in the own vehicle traveling direction is determined by the detection state determinator; and the informing device informs the occupant of the own vehicle travel distance in which the object is not detected and which is calculated by the travel distance calculator. Therefore, a state in which the radar device does not detect an object due to absence of an object on a road in a desert or the like is prevented from being erroneously determined as a state caused by contamination of the radar device, so that the sense of discomfort of the occupant can be eliminated. Also, the occupant can easily determine whether the operation of the informing device is actually caused by absence of an object or contamination of the radar device, based on the environment around the road on which the own vehicle is traveling. Especially because a reflected wave from a road surface, of which intensity changes in accordance with the condition, is not used for determination, it becomes unnecessary to change the setting of the determination threshold value and determination frequency region, and thus the structure and operation are simplified.

The above-described object and the other objects, the characteristics and the advantages of the present invention will become apparent from the description of preferred embodiments that will be described in detail below with reference to the accompanying drawings.

BRIEF DESCRIPTION OF THE DRAWINGS

FIG. 2 is a flow chart explaining an operation.

DETAILED DESCRIPTION OF THE PREFERRED EMBODIMENT

Figure 1:
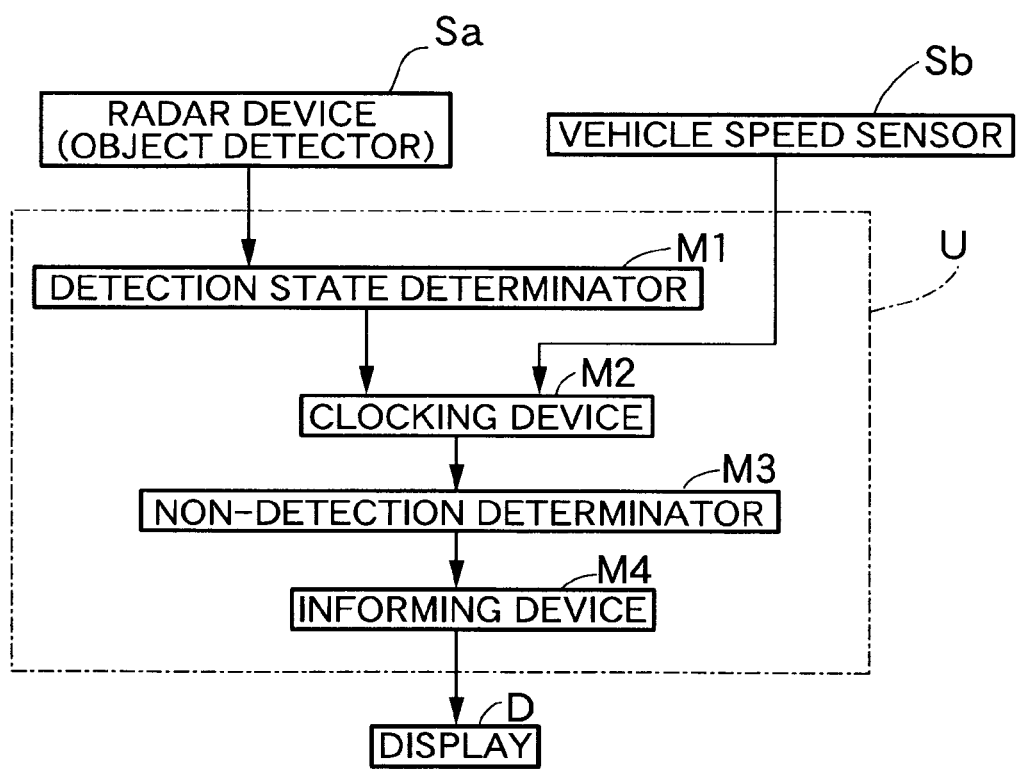
FIG. 1 is a block diagram of an object detecting system for a vehicle according to a first embodiment.

FIG. 1 shows an object detecting system for a vehicle, which is used for an ACC (Adaptive Cruise Control) system or the like which conducts a tracking travel control to travel while securing a predetermined distance from a preceding car when the preceding car is detected, and conducts a constant speed travel control to travel at a previously set vehicle speed when the preceding vehicle is not detected. The object detecting system includes an electronic control unit U which receives, from a radar device Sa, a signal such as a millimeter wave radar or a laser radar, and a signal from a vehicle speed sensor Sb for detecting an own vehicle speed. A display on a display D such as a liquid crystal panel is controlled by the electronic control unit U.

The electronic control unit U includes: a detection state determinator M1 for determining whether or not the radar device Sa detects a target such as a preceding vehicle existing ahead in an own vehicle traveling direction; a clocking device M2 for measuring time during which the target is determined as undetected by the detection state determinator M1 when the own vehicle speed detected by the vehicle speed sensor Sb is at a predetermined value or more; a non-detection determinator M3 for determining whether or not the time measured by the clocking device M2 is at a determination threshold value or more; and an informing device M4 for informing an occupant that the target is not detected for a predetermined time or more, based on the determination result of the non-detection determinator M3; and the display of the display D is controlled by the informing device M4.

Next, an operation of the first embodiment of the present invention will be described based on a flow chart in FIG. 2.

The target absence counter of the clocking device M2 is cleared in step S1 first. When the own vehicle speed detected by the vehicle speed sensor Sb is a predetermined value (15 km/h in the embodiment) or more in step 2, the target information is inputted into the detection state determinator M1 from the radar device Sa in step S3. In step 4, the detection state determinator M1 determines whether or not the target information exists, that is, whether or not an object is detected by the radar device Sa.

When the object is detected by the radar device Sa and the target information exists in the step S4, the informing device M4 clears the target absence information of the display D in step S5. Also, when the own vehicle speed is lower than the predetermined value in the step 2, the informing device M4 clears the target absence information of the display D in the step 5. The reason is as follows: the own vehicle speed often becomes lower than 15 km/h when the own vehicle stops or is caught in a traffic jam, that is, when the own vehicle stops, it is not necessary to detect the target, and therefore it is not necessary to display the target absence information; and when the own vehicle is caught in a traffic jam, the own vehicle is close to the preceding vehicle, and therefore it is not possible to detect the preceding vehicle by the radar device Sa with the minimum detection distance of about 4 m.

When the target information does not exist in the step S4, the target absence counter of the clocking device M2 is incremented by one increment in step S6. This routine is executed in a cycle of 0.1 seconds, and therefore the one increment corresponds to 0.1 seconds. When the target absence counter indicates less than 9,000 which is the determination threshold value in the subsequent step S7, namely, when the duration time of a state of absence of the target information is less than 15 minutes, the informing device M4 clears the target absence information of the display D in step S8.

On the other hand, when the target absence counter indicates 9,000 (15 minutes) or more in the step S7, and the target absence counter indicates less than 18,000 (30 minutes) which is the determination threshold value, namely, when the non-detection determinator M3 determines that the time during which the target is not detected is from 15 minutes to 30 minutes in step S9, the informing device M4 displays the information of "NO TARGET 15 min" on the display D in step S10.

When the target absence counter indicates 18,000 (30 minutes) or more in the step S9, and the target absence counter indicates less than 27,000 (45 minutes), namely, when the non-detection determinator M3 determines that the time during which the target is not detected is from 30 minutes to 45 minutes in step S11, the informing device M4 displays the information of "NO TARGET 30 min" on the display D in step S12.

When the target absence counter indicates 27,000 (45 minutes) or more in the steps S11, and the target absence counter indicates less than 36,000 (60 minutes) which is the determination threshold value, namely, when the non-detection determinator M3 determines that the time during which the target is not detected is from 45 minutes to 60 minutes in step S13, the informing device M4 displays the information of "NO TARGET 45 min" on the display D in step S14.

When the target absence counter indicates 36,000 (60 minutes) or more, namely, when the non-detection determinator M3 determines that the time during which the target is not detected is 60 minutes or more in the step 13, the informing device M4 displays the information of "NO TARGET 1 Hr OVER" on the display D in step S15.

Figure 3A:
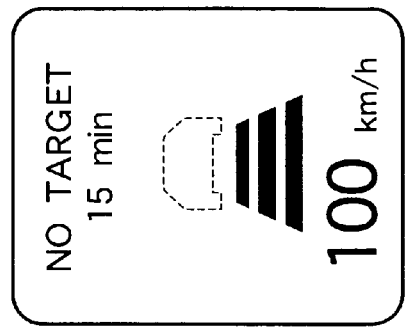
FIGS. 3A to 3F show display according to the first embodiment.
Figure 3B:
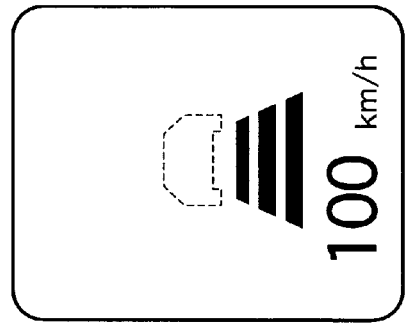
Figure 3C:
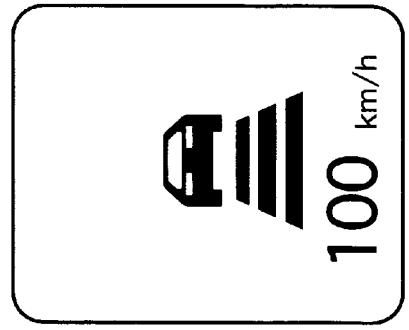
Figure 3D:
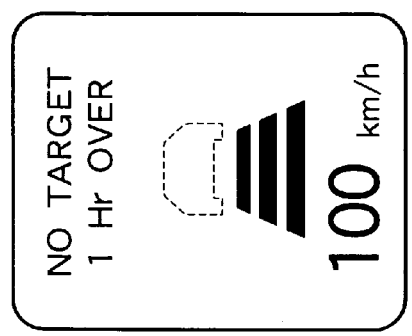
Figure 3E:
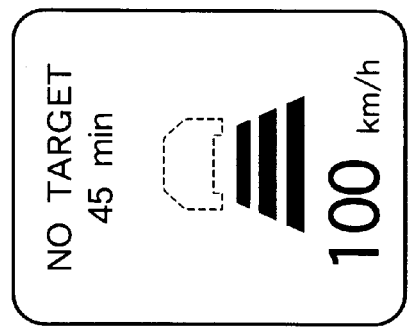
Figure 3F:
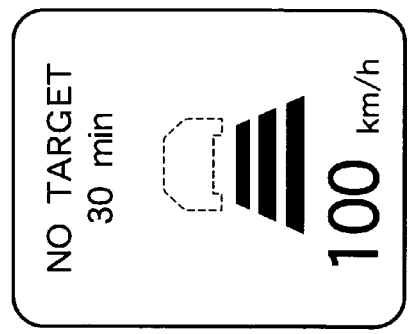

FIGS. 3A to 3F show display examples on the display D. FIG. 3A shows a state in which the preceding vehicle is detected as a target and tracking travel is performed while keeping a predetermined distance from the preceding vehicle. FIG. 3B shows a state in which the preceding vehicle is no detected and constant speed travel at a vehicle speed of 100 km/h which is previously set is performed. FIG. 3C shows a state in which the undetected state of the target lasts for 15 minutes to 30 minutes. FIG. 3D shows a state in which the undetected state of the target lasts for 30 minutes to 45 minutes. FIG. 3E shows a state in which the undetected state of the target lasts for 30 minutes to 45 minutes. FIG. 3F shows a state in which the undetected state of the target lasts for one hour or more.

In this manner, the occupant is informed of the determination threshold value used for determination by the non-detection determinator M3 through the display D, and therefore the occupant can specifically grasp the time during which the radar device Sa does not detect an object.

At what interval the time during which the target is not detected is displayed is optional. For example, the time can be displayed every five minutes; or the first display can be made 20 minutes later, and the subsequent display can be made every ten minutes; or the first display can be made ten minutes later, and the subsequent displays can be made 20 minutes later and 30 minutes later; and the longest display time can be extended to two hours.

When the radar device Sa does not detect the target over a predetermined time, it is suspected that the front surface of the radar device Sa is contaminated with mud or snow to be incapable of detection. However, also in a case where the vehicle travels on a road in a desert or the like where no target exists, there is a possibility that the target is not detected over the predetermined time. Accordingly, if the radar device Sa is indiscriminately determined to be incapable of detection due to trouble or contamination in this case, to stop the operation of the ACC system or the like, not only the occupant is given a sense of discomfort but also normal function of the system is not exerted and detection of the target is impossible.

However, as in this embodiment, when the target is not detected over the predetermined time, if the occupant is informed of the fact without stopping the system, the occupant can easily and precisely determine whether or not the radar device Sa is incapable of detection. Namely, if the above-described information is given in a state in which there is a preceding vehicle or a vehicle coming from the opposite direction, it can be determined that the radar device Sa becomes incapable of detection due to contamination; if the above-described information is given during travel on a road in a desert or the like where there are no preceding vehicle, no vehicle coming from the opposite direction, no roadside object or the like, it can be determined that the radar device Sa normally functions. Especially because the detection state determinator M1 for determining whether or not the radar device Sa detects the target does not use a reflected wave from the road surface, of which intensity changes in accordance with the kind of pavement, snowfall state, rainfall state and the like, it is not necessary to change the setting of the determination threshold value or the determination frequency region, and therefore the structure and operation of the object detecting system are simplified.

Figure 4A:
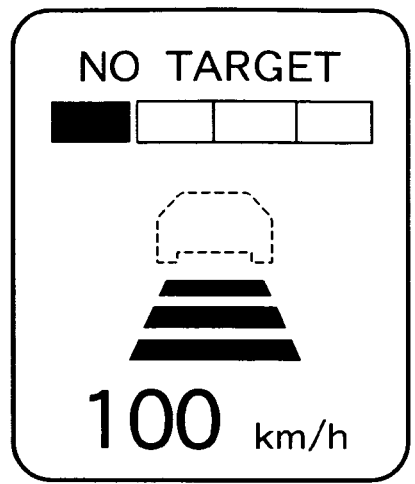
FIGS. 4A to 4D show display according to a second embodiment.
Figure 4B:
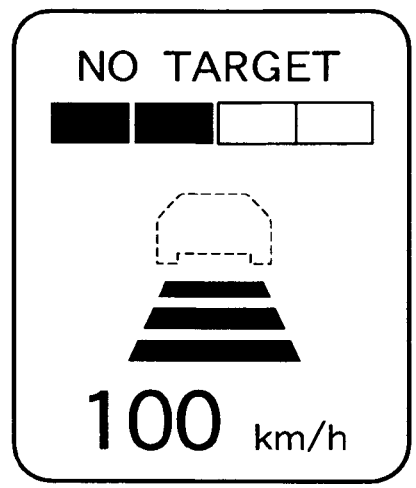
Figure 4C:
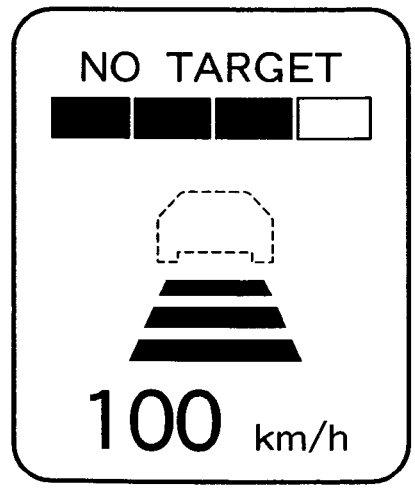
Figure 4D:
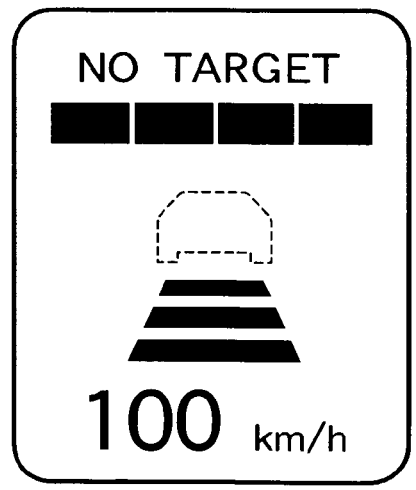
Figure 5A:
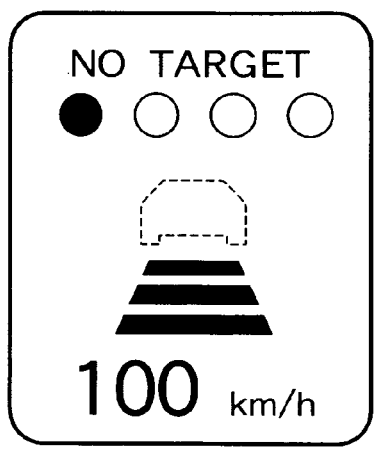
FIGS. 5A to 5D show display according to a third embodiment.
Figure 5B:
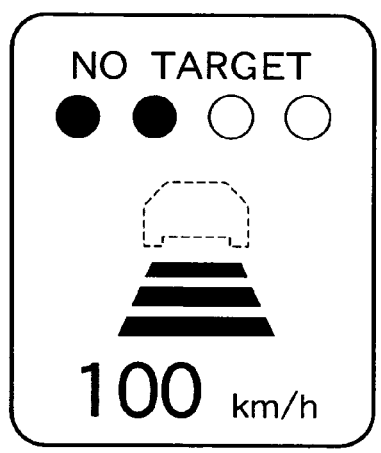
Figure 5C:
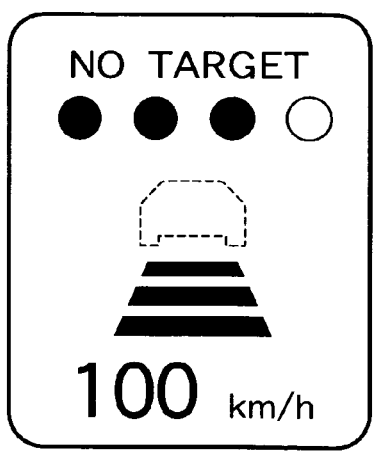
Figure 5D:
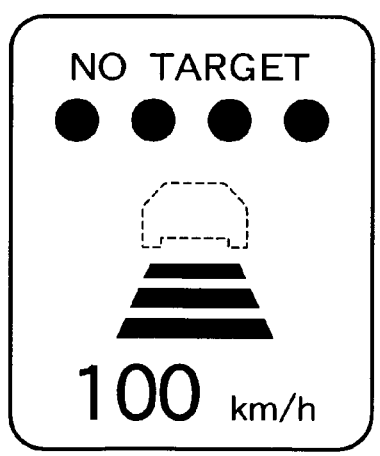
Figure 6A:
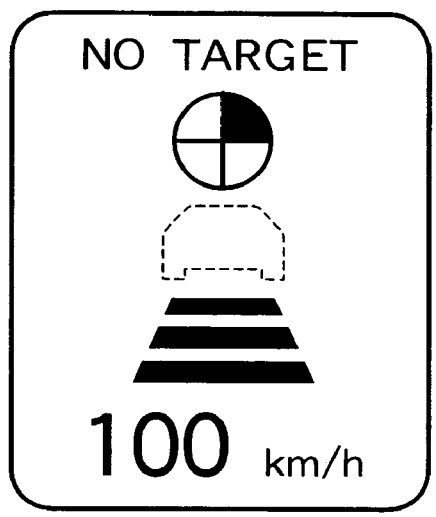
FIGS. 6A to 6D show display according to a fourth embodiment.
Figure 6B:
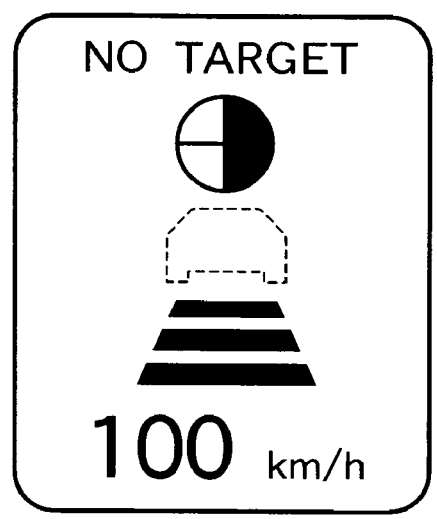
Figure 6C:
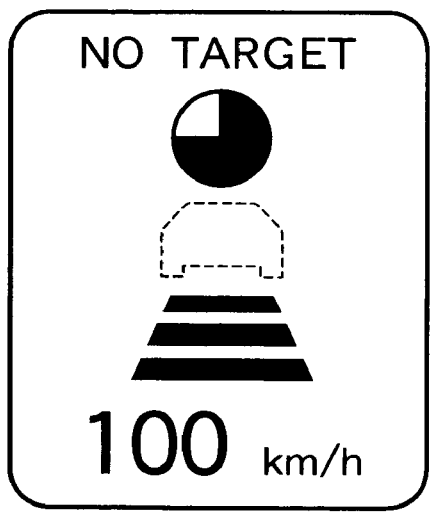
Figure 6D:
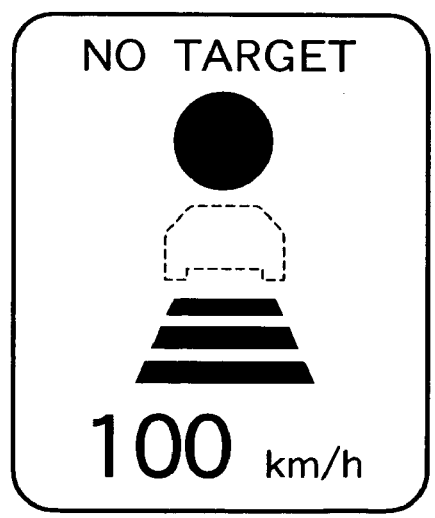

FIGS. 4A to 4D show a second embodiment of display on the display D. While, in the first embodiment, the time duration of the state in which the target is not detected is displayed in numerals, the display in the second embodiment is made by sequentially changing the color of the four rectangular regions. The display with the color of one region changed shown in FIG. 4A shows a state in which no detection of the target lasts for 15 minutes to 30 minutes; the display with the color of two regions changed shown in FIG. 4B shows a state in which no detection of the target lasts for 30 minutes to 45 minutes; the display with the color of three regions changed shown in FIG. 4C shows a state in which no detection of the target lasts for 45 minutes to one hour; and the display with the color of four regions changed shown in FIG. 4D shows a state in which no detection of the target lasts for one hour or more.

FIGS. 5A to 5D show a third embodiment of display on the display D, where the four in-line rectangular regions of the second embodiment are replaced by four in-line circular regions.

FIGS. 6A to 6D show a fourth embodiment of display on the display D, where the four in-line rectangular regions of the second embodiment are replaced by four sector regions forming a circle.

According to the second to fourth embodiments, the same operational effect as in the first embodiment can be achieved. In addition, notification is made by changing the color of any region out of a plurality of regions, and therefore the occupant can visually recognize the information content easily and reliably in a short time, without need to read numerals.

Next, a fifth embodiment of the present invention will be described with reference to FIG. 7.

In the fifth embodiment, the clocking device M2 and the vehicle speed sensor Sb in the first embodiment in FIG. 1 are eliminated, and an own vehicle travel distance in the state in which the detection state determinator M1 does not detect the target is calculated by a travel distance calculator M5 that is provided instead; and the own travel distance is appropriately compared with the determination threshold value through the non-detection determinator M3; and the informing device M4 displays the own vehicle travel distance on the display D by numerals or coloring of a graphic. In this way, the same operational effect can be also achieved by using the own vehicle travel distance in which no detection of the target lasts, in place of the time duration during which no detection of the target lasts.

Figure 8:
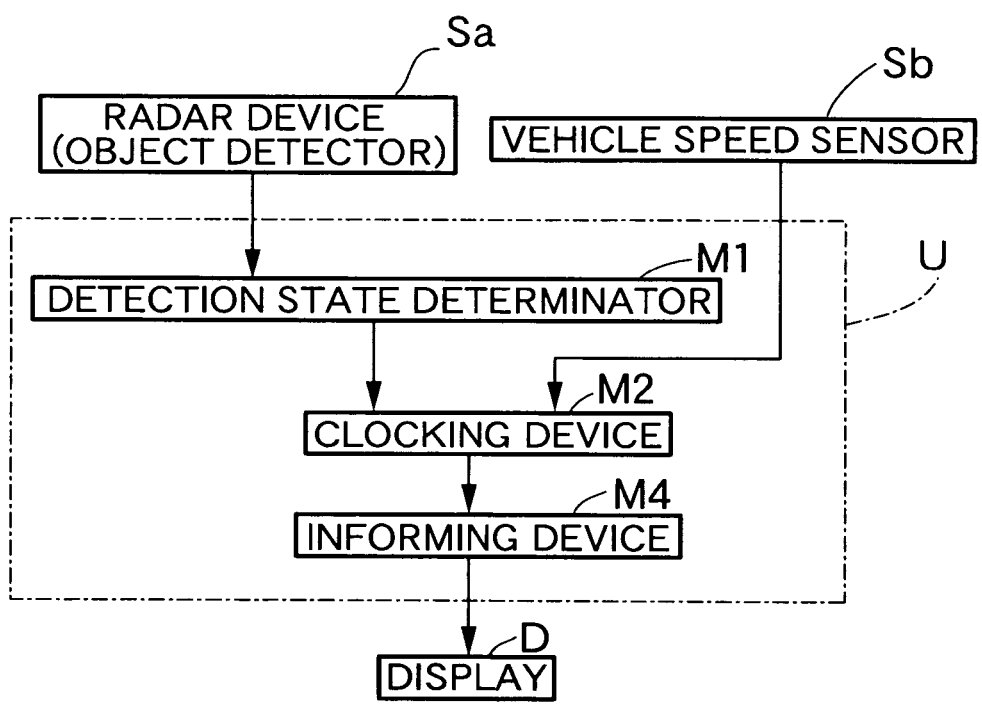
FIG. 8 is a block diagram of an object detecting system for a vehicle according to a sixth embodiment.

FIG. 8 shows a sixth embodiment which is a modification of the first embodiment in FIG. 1.

In the sixth embodiment, the non-detection determinator M3 in the first embodiment is eliminated; the time during which the detection state determinator M1 does not detect the target is measured by the clocking device M2; and the time is displayed on the display D in real time. The same operational effect as in the first embodiment can be also achieved by the sixth embodiment.

Figure 7:
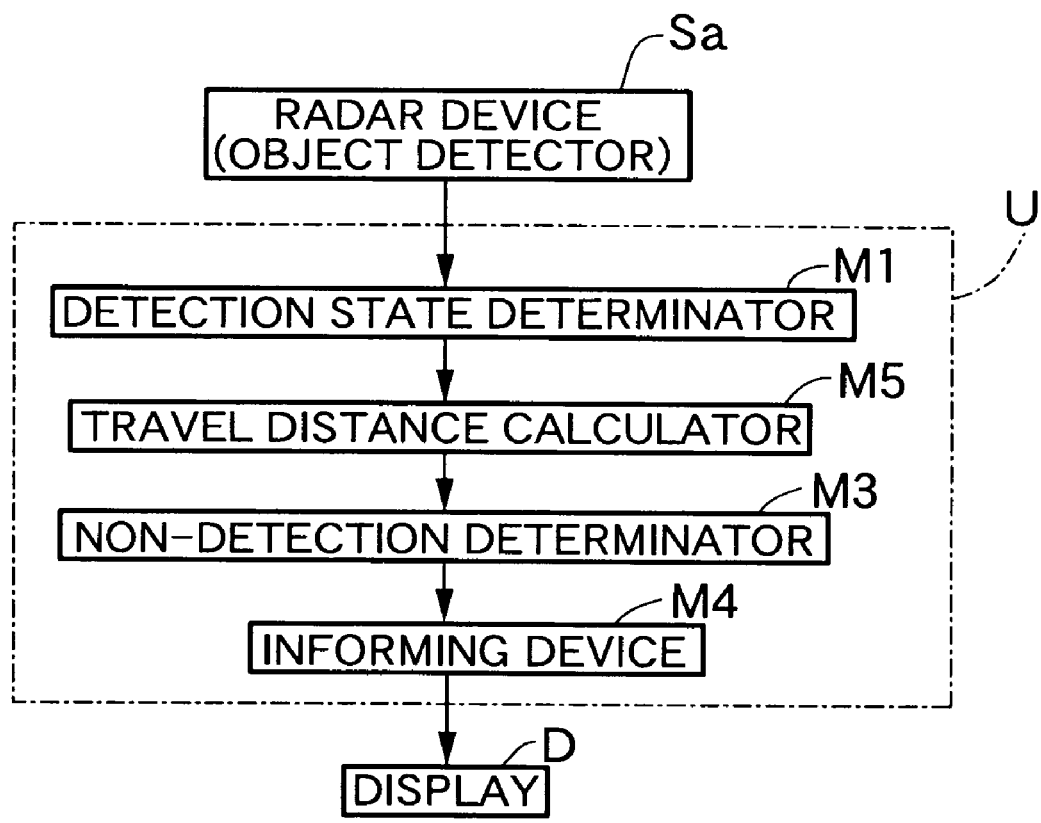
FIG. 7 is a block diagram of an object detecting system for a vehicle according to a fifth embodiment.
Figure 9:
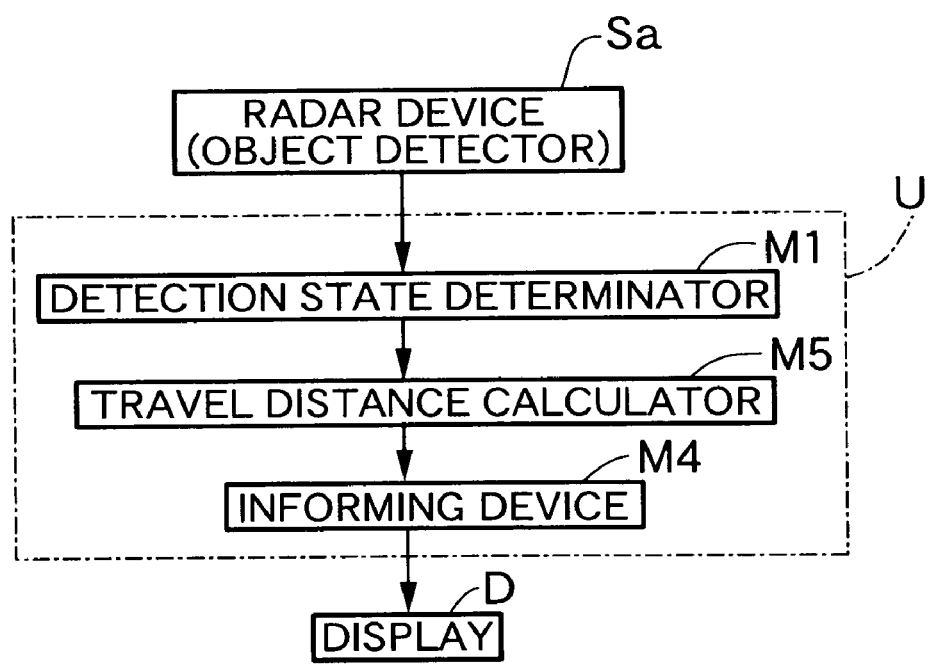
FIG. 9 is a block diagram of an object detecting system for a vehicle according to a seventh embodiment.

FIG. 9 shows a seventh embodiment which is a modification of the fifth embodiment in FIG. 7.

In the seventh embodiment, the non-detection determinator M3 in the fifth embodiment is eliminated, the own vehicle travel distance in which the detection state determinator M1 does not detect the target is calculated by the travel distance calculator; and the own travel distance is displayed on the display D in real time. The same operational effect as in the fifth embodiment can be also achieved by this seventh embodiment.

The embodiments of the present invention have been described above, but various changes in design can be made within the subject matter of the present invention.

For example, in the embodiments, the informing device M4 gives information to the occupant via the image on the display D, but the information can be given via acoustic device such as an artificial voice, a buzzer, and a chime.

The object detector is not limited to the radar device Sa, but may be image-pickup device such as a television camera.

What is claimed is:

1. An object detecting system for a vehicle, comprising:
   an object detector which is mounted on a vehicle and detects an object existing ahead in an own vehicle traveling direction;
   a detection state determinator which determines whether or not the object is detected by the object detector;

a clocking device which measures a time during which it is determined that the object is not detected by the detection state determinator;

a non-detection determinator which determines whether or not the time measured by the clocking device becomes a determination threshold value or more; and an informing device which informs an occupant that the object is not detected for a predetermined time or more, based on a determination result of the non-detection determinator;

wherein the non-detection determinator includes a plurality of determination threshold values, and the informing device changes an information content in accordance with the determination threshold value which is used in determination.

2. An object detecting system for a vehicle, comprising:

an object detector which is mounted on a vehicle and detects an object existing ahead in an own vehicle traveling direction;

a detection state determinator which determines whether or not the object is detected by the object detector;

a clocking device which measures a time during which it is determined that the object is not detected by the detection state determinator;

a non-detection determinator which determines whether or not the time measured by the clocking device becomes a determination threshold value or more; and an informing device which informs an occupant that the object is not detected for a predetermined time or more, based on a determination result of the non-detection determinator;

wherein the information which is given to the occupant by the informing device is the determination threshold value used in determination.

3. The object determining system for a vehicle according to claim 1, wherein the information which is given to the occupant by the informing device is the determination threshold value used in determination.

4. The object detecting system for a vehicle according to claim 1, wherein the informing device gives information to the occupant by changing color of a plurality of regions previously specified on a display in accordance with the determination threshold value.

5. The object detecting system for a vehicle according to claim 4, wherein the plurality of regions are constructed by a plurality of rectangular regions or a plurality of circular regions.

6. The object detecting system for a vehicle according to claim 4, wherein the plurality of regions are constructed by a plurality of sector regions formed by equally dividing a circular region.

7. The object detecting system for a vehicle according to claim 1, further comprising a vehicle speed sensor for detecting an own vehicle speed, wherein the clocking device performs clocking when the own vehicle speed is at a predetermined value or more.

8. An object detecting system for a vehicle, comprising:

an object detector which is mounted on a vehicle and detects an object existing ahead in an own vehicle traveling direction;

a detection state determinator which determines whether or not the object is detected by the object detector;

a travel distance calculator which calculates an own vehicle travel distance in a time during which it is determined that the object is not detected by the detection state determinator;

a non-determination determinator which determines whether or not the own vehicle travel distance calculated by the travel distance calculator becomes a determination threshold value or more; and an informing device which informs an occupant that the object is not detected in a predetermined travel distance or more, based on a determination result of the non-detection determinator;

wherein the non-detection determinator includes a plurality of determination threshold values, and the informing device changes an information content in accordance with the determination threshold value which is used in determination.

9. An object detecting system for a vehicle, comprising:

an object detector which is mounted on a vehicle and detects an object existing ahead in an own vehicle traveling direction;

a detection state determinator which determines whether or not the object is detected by the object detector;

a travel distance calculator which calculates an own vehicle travel distance in a time during which it is determined that the object is not detected by the detection state determinator;

a non-determination determinator which determines whether or not the own vehicle travel distance calculated by the travel distance calculator becomes a determination threshold value or more; and an informing device which informs an occupant that the object is not detected in a predetermined travel distance or more, based on a determination result of the non-detection determinator;

wherein the information which is given to the occupant by the informing device is the determination threshold value used in determination.

10. The object determining system for a vehicle according to claim 8, wherein the information which is given to the occupant by the informing device is the determination threshold value used in determination.

11. The object detecting system for a vehicle according to claim 8, wherein the informing device gives information to the occupant by changing color of a plurality of regions previously specified on a display in accordance with the determination threshold value.

12. The object detecting system for a vehicle according to claim 11, wherein the plurality of regions are constructed by a plurality of rectangular regions or a plurality of circular regions.

13. The object detecting system for a vehicle according to claim 11, wherein the plurality of regions are constructed by a plurality of sector regions formed by equally dividing a circular region.

14. The object detecting system for a vehicle according to claim 8, further comprising a vehicle speed sensor for detecting an own vehicle speed, wherein the clocking device performs clocking when the own vehicle speed is at a predetermined value or more.

* * * * *